June 15, 1954     E. W. KAISER     2,680,901
METHOD OF ASSEMBLING JACKETED CONDUIT SYSTEMS
Original Filed Sept. 4, 1948     2 Sheets-Sheet 1
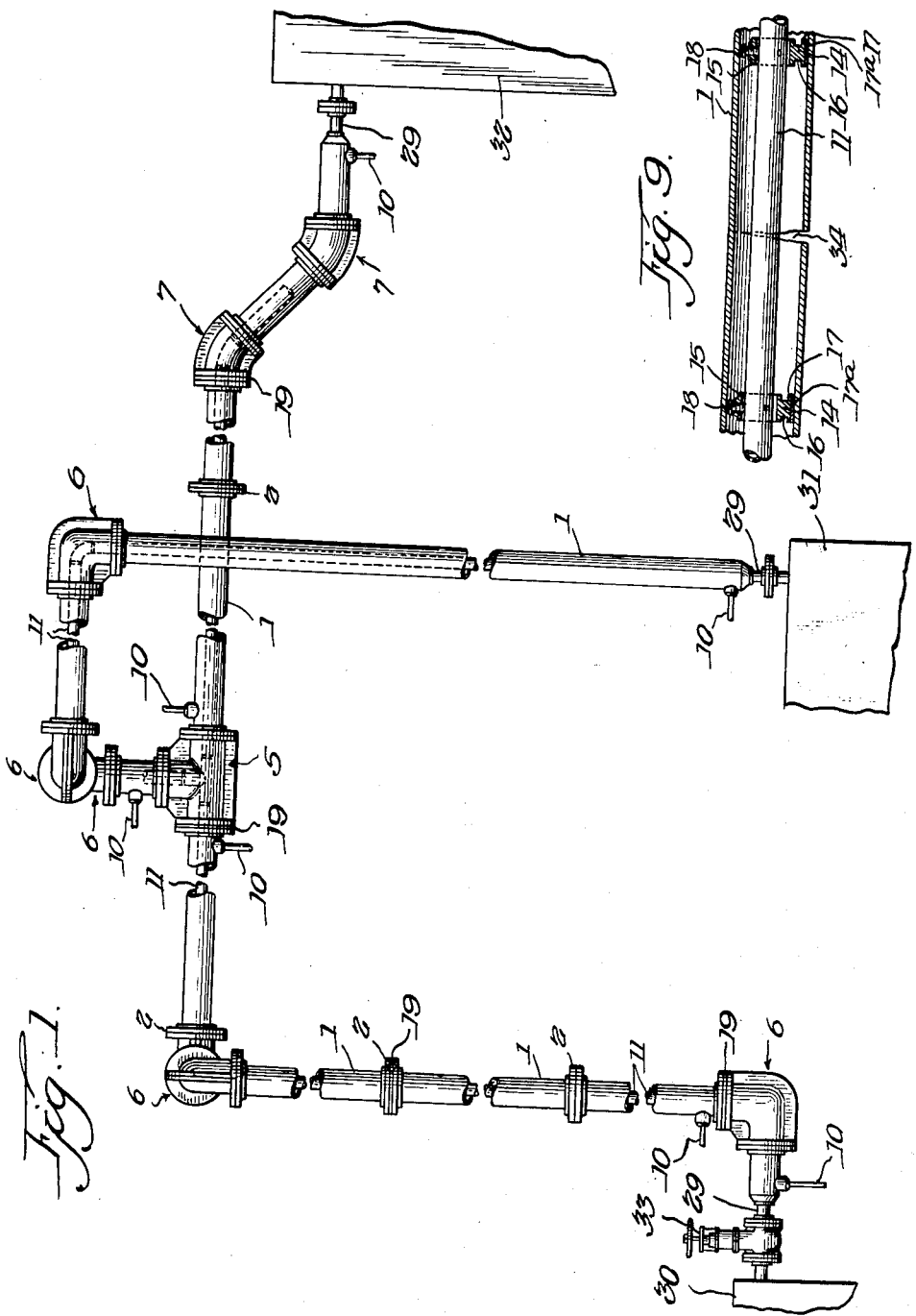
Inventor.
Edward W. Kaiser.
By Robert R. Lockwood Atty.

June 15, 1954
E. W. KAISER
2,680,901
METHOD OF ASSEMBLING JACKETED CONDUIT SYSTEMS
Original Filed Sept. 4, 1948
2 Sheets-Sheet 2
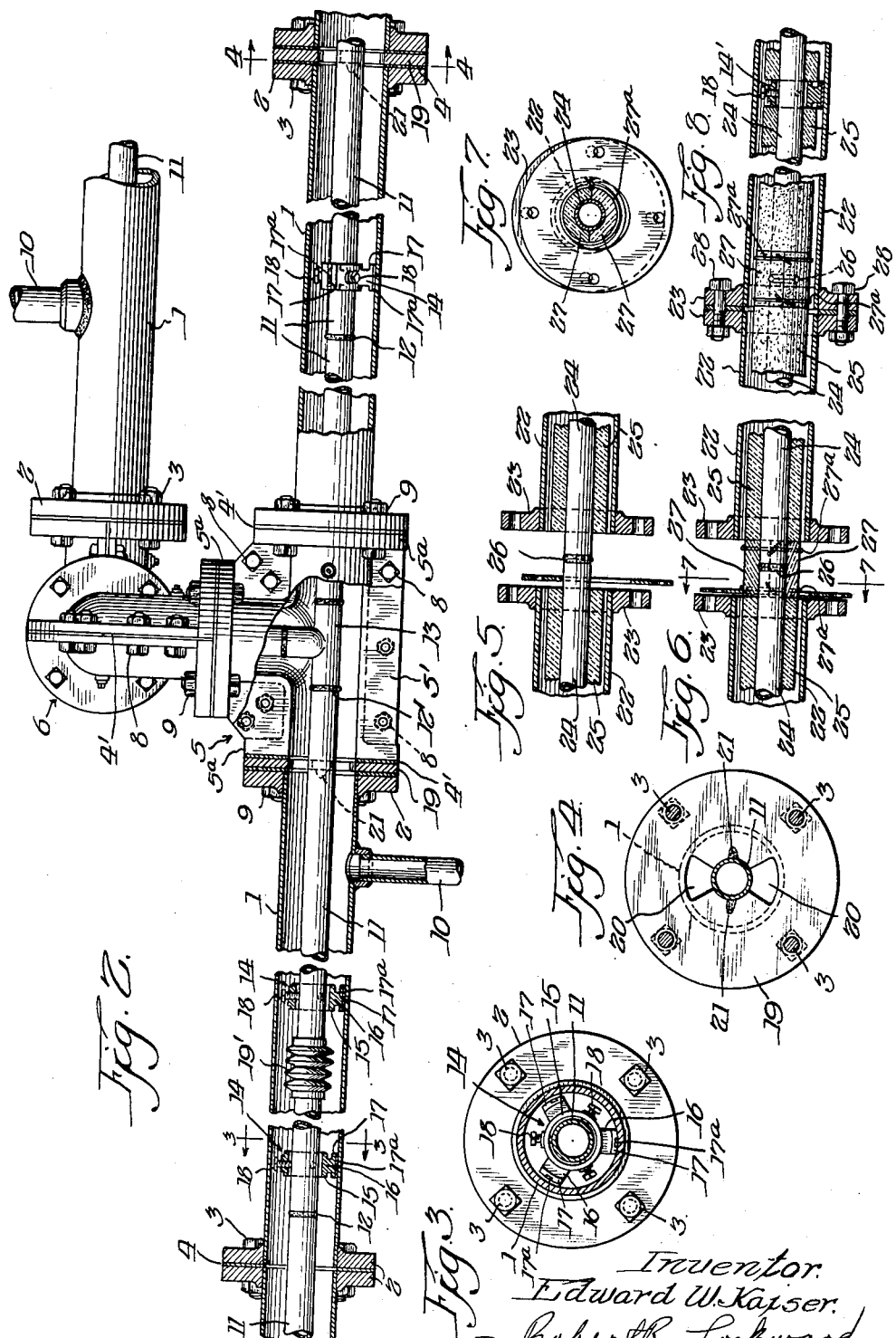
Inventor.
Edward W. Kaiser.
By Robert R. Lockwood
Atty Patented June 15, 1954

2,680,901

UNITED STATES PATENT OFFICE 2,680,901

METHOD OF ASSEMBLING JACKETED CONDUIT SYSTEMS

Edward W. Kaiser, Chicago, Ill.

Application September 4, 1948, Serial No. 47,851, now Patent No. 2,658,527, dated November 10, 1953, which is a division of application Serial No. 511,366, November 22, 1943, now Patent No. 2,570,246, dated October 9, 1951. Divided and this application July 24, 1952, Serial No. 300,647

8 Claims. (Cl. 29—148.2)

This invention relates to jacketed conduit systems and it has particular relation to methods for assembling the same. This application is a division of my co-pending application Serial No. 47,851, filed September 4, 1948, now Patent No. 2,658,527, issued November 10, 1953, which is a division of my application Serial No. 511,366, filed November 22, 1943, now Patent No. 2,570,246, issued October 9, 1951.

An object of the invention is to provide a conduit system wherein the casing or jacketing members thereof are constructed and assembled in a manner which will so support the inner pipe or pipe line therein as to permit unimpeded and reasonably free longitudinal movement of the latter with relation to the former, in order to compensate for expansion or contraction of said inner pipe; moreover, permit of convenient and effectual installation of the inner pipe in the laid casing or jacket members, and/or its removal therefrom for inspection, repair, replacement, etc. (in part or in whole), all with a minimum expenditure of labor and time.

A still further object of the invention is to provide a conduit system so constructed and assembled that an inner pipe or pipe line housed by the casing or jacketing member or line will be allowed to move or be moved longitudinally (in either direction) and/or rotated or partially rotated about its longitudinal axis, and at the same time, firmly and strongly supported in spaced relation, throughout its length, to the walls of the casing or jacketing member or line.

Yet another object of the invention is to provide an integrated conduit system, one which, because of the construction and arrangement of the component parts thereof, is bodily self-sustaining and operatively self-sufficient and complete within itself and will not require external drainage, special supports, and/or foundations.

Another object of the invention is to provide for simply and economically assembling the conduit system by employing inner pipes having a length greater than the corresponding outer pipes, joining the inner pipes together and then joining the outer pipes together by sliding them over the joined inner pipes.

The foregoing, as well as other objects, advantages, and meritorious teachings of my invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other or further modifications and changes may be made in specific embodiments without departing from its essential features.

In the drawings:

Figure 1 is an elevation, with parts broken away, illustrating my jacketed conduit system, plus the interpositioning of jacket fittings, branches, etc., therein, whereby installation directional flexibility of the system may be attained.

Figure 2 is an enlarged fragmentary side view, with parts in section, illustrating the construction and assembly of the jackets or casings and inner pipes of the system, the jacket fittings, the spacers which movably support the inner pipes within and in spaced relation to the walls of the jackets and the jacket fittings, and the pipe anchor plates.

Figure 3 is a transverse section taken on line 3—3 of Figure 2, looking in the direction in which the arrows point, showing one of the spacers and its construction and operative position between the jacket and inner pipe.

Figure 4 is a transverse section taken on the line 4—4 of Figure 2, looking in the direction in which the arrows point, showing one of the pipe anchor plates and its construction and operative position between the jacket and inner pipe.

Figure 5 is a fragmentary longitudinal section through a portion of and illustrating a modified form of my conduit system, i. e., a conduit construction generally consisting of an encased or housed and relatively spaced heat insulated pipe; the adjacent ends of the casing being shown spaced preparatory to completing jointure of the pipe section ends.

Figure 6 is a view similar to Figure 5, in which the joined ends of the pipe sections are bridged or covered by a heat insulating sleeve, i. e., a body of form sustaining heat insulation.

Figure 7 is a transverse section taken on the line 7—7 of Figure 6, looking in the direction in which the arrows point.

Figure 8 is a fragmentary longitudinal section of a portion of the modified form of my invention, showing the heat insulated pipe of the conduit system within the system jacket, and the jacket, and the jacket sections in closed and endwise interconnected position, plus the operative arrangement of one spacer for movably supporting the pipe and its insulating sleeves in lengthwise spaced relation to the system jacket, and Figure 9 is a fragmentary longitudinal section through a portion of the jacketed conduit system, showing the manner in which the inner pipes or line will be firmly and securely supported within the jacket irrespective of a "break-down" of a portion of such jacket; furthermore, how the supported portion of the pipe line bridging the jacket break will actually reinforce said jacket at and beyond the point of break, and so, avoid complete failure until such time as proper repair is effected.

Referring in detail to my invention and to the drawings illustrating the same, with particular reference to the form of invention shown in the Figures 1, 2, 3, 4 and 9, constituting that which I term a jacketed conduit system, said system, generally, comprises a jacket line consisting of a plurality of jacket sections 1 of appropriate lengths and diameters, flanged at their opposite ends, as at 2, whereby they may be fixedly endwise interconnected in the manner shown in Figures 1 and 2, by passing bolts 3 through the juxtaposed flanges 2, between which, if desired, suitable gaskets 4 may be interposed for obvious reasons.

Different and predetermined directional "laying" or installation of a jacket line composed of the jacket sections 1, is effected by interpositioned different or required types of joint fittings between said jacket sections. In the exemplary showing of Figure 1 of the accompanying drawings, I have shown the use of a number of different types of joint fittings, i. e., T joint fittings 5, 90° L joint fittings 6, and 45° L fittings 7. Of course, still other and known types of angle joint fittings, as well as couplings or fitting sleeves may be used as and when required, for particular directional installation of the jackets 1.

While the joint fittings 5, 6 and 7 are, generally, of formation designs heretofore known in the art, I here call attention to the fact that they are of an improved construction, and so, constitute important component parts of my invention.

The T joint fittings 5, of complemental construction, comprise like cross-sectionally semi-circularly shaped sections flanged along their sides at 5' and having coupling flanges 5a on the ends of their respective branches. These sections are matchingly placed together, and constitute cross-sectionally circular fittings, the inside diameters of which substantially correspond to the inside diameters of the jacket sections 1 between which they are interposed, as well shown in Figure 2 of the drawings. Bolts 8 are engaged through complemental openings in the flanges 5' and securely join the fitting sections. Other bolts 9 are engaged through openings in the coupling flanges 5a and serve to connect the medially divided fitting sections 5 to the adjacent flanged ends 2 of the jacket sections 1. Gaskets or packings 4', like those above identified at 4, may be arranged between the juxtaposed fitting section flanges 5', and the coupling flanges 5a and the jacket section flanges 2, for an obvious purpose.

The sectional or longitudinally divided T joint fittings 5 can be varied in their relative arrangement or placement in a jacket line. As shown in Figure 2, two or more may be arranged in adjacent, interconnected positions whereby to attain certain directional dispositions of the jacket section 1 joined thereby.

The joint fittings 6 and 7 are constructed to be like the fittings 5, i. e., they are composed of medially and longitudinally divided cross-sectionally semi-circular sections flanged along their sides for connection by bolts, and having coupling flanges on their respective ends, in order that they can be effectually bolted or otherwise connected to the adjacent flanged ends 2 of the jacket sections 1 between which they are interposed (see Figure 1), or otherwise arranged.

The sectional construction of the joint fittings 5, 6 and 7, in addition to providing a most satisfactory method of joining the jacket sections 1 of a jacket line, also permits convenient and ready access to be had to the interiors thereof merely by removing the connecting bolts 8 and 9 from the flanges of one of the complementally formed sections, whereupon the freed section can be lifted. Since the other section of this fitting will remain intact with the jacket sections, etc., the efficiency and/or security of the joint will not in any way whatsoever be disturbed, and therefore, the jacket line will remain unitary.

Branch pipes 10 are connected to and communicate with the interiors of certain of the jacket sections at appropriate intervals throughout the length or area of the jacket line, serving as outlet ways for heating or refrigerating mediums in those types of jacketed conduit systems where such mediums are flowed through the jacket line, or for air, condensation or gas relief, in other types of installations.

An inner pipe line is provided within and extends longitudinally throughout the line constituted by the jacket sections 1, above described. Said inner pipe line consists of a plurality of endwise disposed sections, generally identified by the numeral 11, of appropriate lengths and diameters. In order to facilitate connection and/or disconnection of the ends of the pipe sections or for other access thereto, it is preferable that said sections shall be of lengths substantially corresponding to or in some instances, somewhat greater than those of the jacket sections 1 receiving the same.

Connection between the adjacent ends of the pipe sections 11 can be effected in various ways well known in the art. In the illustrated embodiment of the invention, these pipe ends are shown connected by welding, as at 12. Other connections between certain of the adjacent ends of the pipe sections may be and are made by joint fittings. In particular, where the pipe line is extended through the branches of a jacket section T joint fitting 5 (see Figure 2), a T joint fitting 13 is interposed in aligned relation between the juxtaposed ends of the pipe sections 11 within said fitting 5, and is connected, by welding 12' thereto. Different types of pipe joint fittings corresponding to the particular type of jacket section 1 joint fittings 5, 6, 7, etc., in which they are placed, may be used, i. e., the pipe T joint fitting 13 will be used in the jacket section T joint fitting 5, while a 90° L pipe joint fitting will be used in the jacket section L fitting 6, and a 45° L pipe joint fitting will be used in the jacket section L fitting 7, etc.; all as clearly indicated in Figures 1 and 2 of the drawings.

The outside diameters of the inner pipe sections 11 and the joint fittings employed to interconnect the same are less than the inside diameters of the jacket sections 1 joint fittings 5, 6 and 7. Therefore, it will be seen and appreciated that when such pipe joint fittings are arranged within a jacket line constituted by said sections 1 and fittings 5, 6 and 7, a continuous space or flow-way will be effected therebetween, as hereinafter more fully described.

To support the inner pipe line consisting of the pipe sections 11 and joint fittings 13, within the jacket line, consisting of the jacket sections 1 and the joint fittings 5, 6 and 7, in spaced relation to the latter entirely throughout their respective lengths, and to allow said inner pipe line or portions of the same to move or to be moved longitudinally in either direction and/or to rotate or partially rotate about their longitudinal axes within said jacket line, I engage spacers or supporting devices 14, constructed of strong and durable metal or other suitable material, over and about the sections 11 of the pipe line at predetermined and spaced points throughout its length. Any number of these spacers may be employed, such as conditions or preference may dictate and as hereinafter indicated.

Each of the spacers 14 comprise an annular collar-like body 15 provided on its outer peripheral surface with fixed relatively spaced radially disposed legs 16 having feet 17 preferably integral with their outer free ends.

It is desirable that the diameter of the collar-like body 15 shall be somewhat greater than the outside diameter of the inner pipe sections 11, whereby when engaged thereover and thereabout, said body will be annularly spaced from the adjacent portion of an inner pipe section (see Figure 3). Jackscrews 18 are engaged through suitable screw-threaded openings formed in the body 15 in substantially equi-spaced relation. The screws are turned inwardly into engagement with portions of the adjacent pipe section 11, thereby immovably connecting the spacer to the same. By adequate adjustment of the jackscrews 18, the body 15 of the spacer will be fixed in annularly spaced relation to the pipe section 11, as above described. Thus, heat or cold transmission between the jacket sections 1, and the pipe sections 11, via the spacer 14 will be reduced to minimum.

If desired, toes 17a, formed of lead or similar material, are inset in the feet 17 of the spacer leg 16 and serve to reduce friction between said feet and adjacent portions of the inner periphery of the jacket section 11 upon longitudinal or transverse movement of the inner pipe 11 and the spacer 14.

As hereinbefore stated, under certain conditions of use or operation of the improved jacket conduit system, the inner pipe line, composed of the section 11, will move or shift longitudinally in either direction in the jacket line receiving the same, i. e., by expansion or contraction of the inner pipe line through the transmission thereto of heat or cold of different temperatures. It is essential that the extent of this longitudinal movement shall be controlled and/or limited. To effect such, I mount anchors 19 on the sections 11 of the inner pipe line at predetermined points throughout its length, in the manner presently described.

The anchors 19 are of complemental construction. Each comprises a circular plate, preferably of steel of suitable gauge, having a substantially circular opening formed centrally of the same, adapted to rather snugly receive a pipe section 11 therethrough. Other openings or ports 20, of appropriate size and shape are formed in the anchor plate outwardly of its pipe section receiving central opening, and particularly, in those portions of said plate which transversely span the space (flow-way) between the outer periphery of the inner pipe 11 and the inner periphery of the jacket 1.

The anchor plates 19 are positioned transversely of certain of the adjacent and flanged ends 2 of the jacket sections 1, and have their respective outer portions (beyond the outer peripheries of said sections 1) flatly engaged between the jacket section and jointure effecting flanges 2. Thereupon, the anchor plate 19 and the flanges 2 are securely interconnected by bolts 3 passed through said flanges, as heretofore described, and through appropriate openings in the anchor plate. And as above stated, gaskets or packings 4 may be arranged between the jacket section flanges 2 and adjacent portions of the anchor plate, to ensure fluid-tight jointure.

Permanent and positive connection between the anchor plate 19 and the inner pipe section 11 is made, preferably, by welding, as at 21.

Anchor plates 19, as above, are arranged in the jacket sections 1 of the jacket line at appropriate intervals of from fifty feet to upwards of three hundred feet, throughout the length of said jacket line, while to afford sufficient compensation and/or relief for longitudinal movement (expansion and/or contraction) of the inner pipe sections 11 of the inner pipe line in the jacket line of the system, suitable and known types of expansion joints, as for example, a bellows type of expansion joint indicated at 19', are arranged or interposed in said inner pipe line at desirable points throughout its length. Of course, different types of expansion joints, all well known in the art, may be substituted for the, or some of the bellows type expansion joints 19', as may be desired. In consequence, the extent of longitudinal expansion and/or contraction of the inner pipe line (the interconnected inner pipe sections 11) between the installed anchor plates 19, will be effectually controlled in that longitudinal movement of the pipes 11 will be resisted at their various points of anchorage to the jacket line (jacket sections 1) by means of said anchor plates. However, those portions or lengths of the inner pipe line between the above referred to points of anchorage thereof will be allowed sufficient longitudinal expansion and/or contraction to prevent their detrimental distortion or fracturing. Furthermore, because of the openings or ports 20 formed in those portions of the anchor plates 19 which span the flow-way between the jacket sections 1 and the inner pipe sections 11, it is manifest that said flow-way will not be obstructed, and so, will permit the unimpeded flow of fluid, etc., throughout the same.

While I have hereinbefore described the anchor plate or plates 19 as functioning to effect control of the extent of longitudinal movement of the inner pipe line or inner pipe sections, as through expansion or contraction of the same, it is to be understood that said plates will also equally well serve to limit or control the extent of longitudinal movement of the jacket line or jacket sections 1 with relation to the pipe line or pipe sections 11, especially, in those instances where the jacket sections 1 will expand or contract by the transmission of high temperatures thereto from fluids, liquids, etc., passing through the aforesaid flow-way, in contradistinction to the passage of high temperature fluids or liquids through the inner pipe line or inner pipe sections 11.

The anchor plates 19, under certain conditions, may be and preferably are interpositioned between adjacent or meeting ends of the jacket sections 1 and the jacket section joint fittings 5, 6 and 7. In point, reference is made to Fig. 2, which shows the position of anchor plates 19 between the flanged ends 2 of jacket sections 1 and the flanged ends of the longitudinally and medially divided T joint fitting 5. The arrangement and connection of the anchor plates 19 corresponds with that hereinabove described.

Referring now to the modified form of my invention illustrated in Figures 5, 6, 7 and 8 of the accompanying drawings, I characterize the same as a conduit system. Said conduit system is distinguished from the previously described jacketed conduit system in that it does not effect the provision of a jacketed flow-way or area about and along its inner conducting pipe or pipe line, through which heating or cooling mediums are flowed. To the contrary, my modified improved conduit system is primarily intended to house and protect a heat insulated inner pipe line which, in turn, is supported in and extends longitudinally through the system housing or casing line in annularly spaced relation to the inner periphery thereof and in a manner to provide, between the pipe line and the housing line, a continuous, uninterrupted and unimpeded flow-way for internal pressure relief, drainage, etc.

To the above indicated ends, the conduit system, generally, comprises a housing line consisting of a plurality of casing sections 22 arranged in endwise adjacent relation (see Figure 8), the adjacent ends of the casing sections being flanged at 23 to permit their interconnection, as hereinafter more fully described, and an inner pipe line consisting of a plurality of endwise adjacent and interconnected inner pipe sections 24 movably supported in and disposed longitudinally of and through the casing line in spaced relation thereto.

To movably support the inner pipe line (the pipe sections 24) within the casing sections 22, in annularly spaced relation thereto, I fixedly engage spacers 14', similar to the heretofore described spacers 14, about and over said inner pipe line at predetermined intervals throughout its length. The outer ends or feet of the radially disposed legs of the spacers 14' have movable bearing engagement with adjacent portions of the inner periphery of the casing sections. Consequently, the inner pipe line will be allowed longitudinal movement, in either direction, with relation to the casing sections, and therefore, will be permitted to compensate for expansion or contraction thereof, occasioned or caused by the temperatures and temperature variations of matters flowed therethrough. Furthermore, when matters (fluids, gases, liquids, etc.) are flowed through the inner pipe line under high pressures, said pipe line will oftentimes be caused to partially rotate or turn on itself or about its longitudinal axis. At and during such times, the spacers 14' connected to the affected portions of the inner pipe line, will be permitted to correspondingly rotate or turn in the casing line, and thus, will avoid damage to said inner pipe line; moreover, will ensure the continued support of the pipe line in its aforesaid annularly spaced relation to the inner peripheral surface of the casing line throughout the entire length of the conduit system.

Form sustaining insulation material 25 is engaged entirely about the inner pipe sections 24 in the casing sections 22. The outside diameter of this material 25 is less than the inside diameter of a receiving casing section 22. Therefore, an annular space or flow-way is effected between the material and the casing section throughout its length, particularly, because of its support from the pipe section 24 which, in turn, is supported throughout its length by the spacer or spacers 14'.

The form sustaining insulation 25 is extended longitudinally over and about the inner pipe section into abutting engagement with both sides of the spacer or spacers in the casing section 22, as indicated in Figure 8, for an obvious purpose.

The lengths of the inner pipe sections 24 are somewhat greater than those of the casing sections 22. Therefore, the juxtaposed end portions of the sections 24, prior to joining or connecting the casing section flanges 23, will extend from their respective casing sections 22, in the manner shown in Figure 5 of the drawings and will be conveniently and readily accessible whereby, following endwise engagement therebetween, they can be effectually connected by welding 26, or other suitable means, in a minimum of time.

Following connection of the inner pipe section ends, at 26, the extended insulation-bare end portions of the inner pipe sections 24, are covered by complementally formed cross-sectional semi-circular form sustaining insulating pieces 27 which are secured thereto and thereabouts by bands or ties 27a, in the manner shown in Figures 6 and 7. The over-all outside diameter of the pieces 27 corresponds to and is contiguous with that of the form sustaining insulation 25. Thus, when the jointure flanges 23 are brought into abutting contact by longitudinally moving one or both the casing sections 22, in the proper direction, and are fixedly interconnected by bolts 28 passed therethrough, a continuous, uninterrupted and unimpeded flow-way will be effected over and about the same.

The continuous, uninterrupted and unimpeded flow-way between the insulation covered inner flow-way or inner pipe sections 24 and the inner peripheral surface of the casing line composed of the interconnected casing sections 22, provides an effectual internal pressure relief or drainage means. For example, should failure of the inner pipe line occur and leakage therefrom be permitted, a destructive accumulation of built-up internal pressure within the casing line will be prevented, in that such pressures will be distributed through the casing line and outletted therefrom, as through the use of outlet ways or branches, such as shown in connection with the heretofore described jacketed conduit system and identified by the numeral 10. Furthermore, should condensation occur within the casing line, such condensation will be conveyed via the aforesaid flow-way and outletted therefrom, by means of suitable outlets, such for example as those above identified by the numeral 10.

As in the jacketed conduit system heretofore described, the conduit system shown in Figures 5–8, is provided with anchor plates like those identified by the reference numeral 19. Said anchor plates are engaged over and about the lengths or sections 24 of the inner pipe line at suitable and effective intervals throughout the over-all length of the inner pipe line—say, at intervals of from fifty to upwards of three hundred feet. The plates 19 are welded or otherwise securely connected to adjacent portions of the inner pipe sections 24, while their outer portions are flatly engaged between certain of the adjacent jointure flanges 23 of the casing sections 22 constituting the housing line, in the same manner as shown in Figures 2 and 4 of the drawings illustrating the jacketing conduit system.

Where the conduit system includes the use of joint fittings, such as shown in Figures 1 and 2 of the drawings and identified by the numerals 5, 6 and 7, for directional disposition thereof, it will, of course, be understood that anchor plates 19 can be arranged and secured between said fittings and certain of the adjacent ends of the casing sections 22, in that manner shown in said figures.

By the same token, to provide direct relief for the longitudinal expansion or contraction movement of the inner pipe line, i. e., to compensate for such movement, suitable types of expansion joints, such as shown in Figure 2, or other and well known forms thereof, are preferably arranged or interposed at suitable points therein.

My improved jacketed conduit system and/or conduit system can be constructed and installed in different uses, and for different characters of directional conduction or distribution of those matters flowed through either.

In Figure 1 of the accompanying drawings, I have illustrated a jacketed conduit system installation, primarily intended for use in conducting fluids, liquids and/or heavy viscous matters through the inner pipe line constituted by the pipe sections 11 and their various fittings. The system is equally well suitable for surface, subterranean, marine, or above terrain surface installation. Different directional installation of the system may, of course, be effected by suitable arrangement and assembly of the required number of jacket sections 1 and inner pipe sections 11, plus joint fittings, as above described, and spacers 14 and anchors 19.

The matters flowed through the inner pipe line can be maintained at predetermined temperatures desirable or necessary for their proper form retention or flowability, as in the case of viscous matters, by the flowing of a suitable exchange medium (heating or refrigerating) through the continuous, unimpeded flow-way between the inner pipe line 11 and the jacket line 1.

With other types of installations of the jacketed conduit system, the jacket line can be most advantageously used as a casing or tunnel for the inner pipe line, whereby to protect the latter, and also, to provide a definite factor of safety, as in the event of leakage in the pipe line, in the event of which the jacket line receiving such leakage will function as a secondary conductor therefor until necessary repairs are made.

In the installation illustrated by Figure 1, connection between the jacketed conduit system and supply and/or receiving means may be effected by connecting reducer fittings 29 to the outer ends of the adjacent jackets 1 and extending the pipe sections 11 therethrough into connection with such means 30, 31 and 32. If desired, control valves, such as the one identified by the reference numeral 33, can be provided to the extended pipe section portions for an obvious purpose.

The conduit system shown by Figures 5, 6, 7 and 8 of the drawings is, more generally, intended for surface, subterranean and/or marine use, though it is mainfest that it is not limited to such usage. The inner pipe lines 24 and the housing or casing lines 22 will, of course, be arranged and assembled in the manner hereinbefore described to effect the desired directional installation, i. e., an installation such as shown in the jacketed conduit system installation by Figure 1.

The conduit system is primarily intended for the conduction and distribution of highly heated matters by and through its inner pipe line, during which the temperatures of these matters will be maintained at the desired or required degree. Under such operation conditions, it is essential that heat losses be kept at minimum. Therefore, the sections 24 of the inner pipe line are provided with the heretofore described form sustaining heat insulation 25, and furthermore, said sections are supported in annularly spaced relation to the inner peripheral surfaces of the casing sections 22 through the spacers 14' which, it will be borne in mind, have only minimum supporting contact or engagement with adjacent portions of their respective pipe line sections through the adjustable jack screws 18 (see Figure 8).

Because of the fact that the inner pipe line of the sections 24 and their insulation 25 are supported on the relative spaced spacers 14' within the housing line sections 22, in annularly spaced relation to the inner peripheral surfaces of the latter, a continuous unimpeded flow-way is effected between said sections 22 and the outer peripheral surfaces of the inner pipe section carried insulation 25. This flow-way is also maintained by and between the joint fittings of the inner pipe line sections and the housing sections. Accordingly, and as described, an effectual overall drainage means is had for condensation, liquid leakage, etc., and moreover, the accumulation and presence of detrimental pressures within the housing line are positively eliminated due to the constant relief therefor, i. e., the aforesaid flow-way.

As shown in Figure 9 of the drawings, the jacket line 1 of the jacketed conduit system provides an extremely strong and durable means for housing the inner pipe line 11 or sections thereof. Due to the fact that the inner pipe line 11 is supported within the jacket line on the aforesaid relatively spaced spacers 14, it is of importance to here note that relative inter-bracing of or between the jacket line and the inner pipe line is effected, i. e., the jacket line 1 will effectually brace or reinforce the inner pipe line 11, and said inner pipe line 11, because of its disposition in and through the jacket line 1, will brace or reinforce it. Consequently, should the jacket line fail or break at a point between certain of the relatively spaced spacers 14 supporting the inner pipe line 11 within said casing line, it will be readily seen and appreciated that the inner pipe line will remain supported and will effectually bridge or span the failing or broken portion of the jacket line or section, indicated at 34. In consequence, whereas failure of the jacket line will occur, a resultant failure of the inner pipe line will be successfully prevented as between the time of the failure and its repair. By the same token, if, for any reason, the inner pipe line 11 or a section thereof, shall become broken or otherwise operatively impaired, it will be understood that said line will, nevertheless, be adequately supported within the particularly adjacent portion of the jacket line, and furthermore, that said jacket line will ensure maintenance of the broken or impaired inner pipe line portion in supported position so that the remainder thereof can be moved longitudinally of the jacket line, to compensate for either expansion or contraction, or to enable convenient and ready removal of the damaged portions of the inner pipe line for repair or replacement.

Due to the fact that the heretofore described joint fittings 5, 6 and 7 of the system jackets or housings are substantially contiguous with such jackets or housings interconnected thereby, and also, that these joint fittings are preferably constructed of heavy, strong and durable material, they will produce, in combination with the jackets or housings, a highly efficient longitudinally stress resistant unitary structure. Being securely connected in co-axial alignment to adjacent ends of the jacket and/or housing sections making up a line, these joint fittings will actually reinforce such line or lines, in that they will amply resist those longitudinal stresses, in either direction, which may be expected to and will be imparted thereto from the jacket or housing line per se, and in consequence, will eliminate detrimental or disastrous joint failures, as well as ensure constant and dependable maintenance of the all-important continuous flow-way between the jacket and/or housing lines and the inner pipe lines.

It may be here noted that the method of installing and assembling a conduit system embracing my invention is a beneficial, new, useful and meritorious contribution to and advance in the art. As hereinbefore stated, the lengths of the inner pipe sections are greater than those of the casing or jacket sections. In consequence the opposite ends of the pipe sections within their respective casing or jacket sections extend outwardly of and beyond the opposite ends of the latter. Being so extended and exposed, the adjacent end portions of the pipe sections can be conveniently and readily adjusted or moved to bring their ends into abutting or meeting relation, following which, such ends can be as advantageously connected, as by welding (hereinbefore described), or other suitable means.

Following connection of the meeting ends of the exposed and extended portions of the inner pipe sections, one of the substantially juxtaposed casing or jacket sections is moved or shifted so as to bring its inner or near end into meeting engagement with the corresponding end of the adjacent casing or jacket section. Thereupon, connection between the flanged ends of said casing or jacket sections, such as heretofore described, or other effectual and satisfactory union is made.

The connections between the inner pipe section ends and the casing or jacket ends, it will be noted upon reference to Figures 2, 5, 6 and 8 of the accompanying drawings, are relatively vertically disaligned or staggered, i. e., the inner end poriton of the aforesaid moved or shifted casing or jacket will overlie the connection between the meeting ends of the inner pipe sections (see Figures 2 and 8). Being thus relatively positioned, it will be understood and appreciated that the inner pipe section end and casing or jacket section end connections will afford materially greater strength and resistance to deterioration, rupture or other failure occasioned by applied stresses.

In completing the installation and assembling of my improved conduit system, after the connection of the aforedescribed inner pipe end and casing or jacket end connections, the inner pipes and casings or jackets of the succeeding sections of the system line are likewise connected and disposed. During the assembly, as the casing or jacket sections are succeedingly moved into end meeting engagement (following end connection of the inner pipe sections) with the immediately preceding ones and connected thereto, it will be seen and appreciated that the pipe line constituted therewithin by the inner pipe sections will progressively grow from and out of one end of the casing or jacket section constituted line. Such an outgrowth of the inner pipe line is, oftentimes highly advantageous and desirable, as where entrance and passage of the inner pipe line through a wall is required, or where certain lengths of the pipe line beyond its casing or jacket line are needed for the connection and/or installation of devices or appurtenances thereto or therein.

When the form of conduit system shown in Figures 5–8 is installed, I practice the above-described method of assembly and in addition, effect the use of the form sustaining insulating material or sleeves 25 in the following described manner.

The inner pipe sections 24 are supported in spaced relation to and within their respective casing sections 22, as hereinbefore described, by means of a desired number of relatively spaced spacer supports 14'. It is preferable that in a single length of casing section 22 and on a length of pipe section 24 engaged in and through the former, a plurality of spacers 14' shall be employed. One of said spacers is engaged with and locked, by its screws 18, to a substantially medial or an intermediate portion of the pipe section. Other spacers 14' are likewise mounted and connected one on and in proximity to either end of said pipe section. Thus, it will be seen that the pipe section 24 will be supported within and throughout the length of the casing section 22 in spaced relation thereto much in the manner shown in Figure 2 of the drawings.

Such an assembly and supporting of the pipe section 24 within the casing section 22 is advantageous in shipping or transporting of the sections, particularly in affording space conservation and incident economies, plus handling facility, etc.

When assembling the insulating conduit, the spacers 14' on the opposite end portions of the pipe section 24 are removed therefrom. At this time and with the pipe section supported medially or intermediately of its ends within the casing section by the remaining spacer 14', a length or lengths of form sustaining insulating material or sleeves 25 are slid onto and over the pipe section on the opposite sides of said remaining spacer. The inner ends of the thus opposed insulating sleeves 25 are abuttingly engaged with the adjacent sides of the remaining and intermediate spacer (see Figure 8). Thereupon, with the outer ends of the insulating sleeves disposed in proximity to the adjacent ends of the pipe section 24, said sleeves are secured against movement longitudinally of said pipe section by reengaging the previously removed spacers 14' on or over the opposite portions of the pipe section and with adjacent ends of the insulating sleeves, and locking the same thereto by their respective screws 18.

As hereinbefore described, where the meeting ends of pipe sections 24 are connected, as indicated at 26, these particular portions may be and preferably are covered by the form sustaining insulating pieces or semi-sleeves 27 secured by ties 27a as shown in Figures 6 and 8.

In instances where the spacers 14' are not engaged with the outer or opposite end portions of a pipe section 24 within a casing section 22, but where said spacers are positioned somewhat inwardly of the casing section opposite ends, insulating material pieces or sleeves 25 are engaged over said outer or opposite end portion of the pipe section outwardly of the spacers and abutting the same. The outer ends of these sleeves terminate substantially at the adjacent ends of the casing sections, as shown in Figures 5 and 6. The form sustaining insulating pieces or semi-sleeves 27 are then engaged over and about the extended and connected end portions of the inner pipe sections 24 and secured by the ties 27a.

Since the pieces 27 abuttingly engage the adjacent ends of the adjacent sleeves 25, said sleeves will be prevented from having longitudinal shifting or sliding movement on the pipe section or sections 24.

Following the connection of the pipe section ends and their insulation, as described, one of the casing sections 22, is moved longitudinally into end contact with the end of the preceding or adjacent casing section and connected thereto, while the succeeding casing sections are similarly moved and connected as heretofore described.

I claim:

1. A method of assembling the casing line and pipe line sections of a conduit system and connecting and relatively disposing the meeting ends of said sections, wherein the pipe line sections extend through and are circumferentially spaced from and slidably mounted by spacers within the respective casing line sections throughout their lengths and the ends of said pipe line sections are extended beyond the ends of the respective casing line sections, which comprises applying a spacer to each pipe line section intermediately its ends, individually engaging each pipe line section through a casing line section with the opposite ends of the former extended beyond the adjacent ends of the latter, endwise arranging the casing and pipe line sections in substantially coaxial relation for a length of the conduit system, at one end of said length connecting the extended meeting ends of the pipe line sections in fluid tight relation while the corresponding ends of the casing line sections are relatively spaced and expose and afford access to said meeting ends of the pipe line sections, then moving the next casing line section longitudinally into meeting engagement with the corresponding end of the preceding casing line section at said one end of said length beyond and over the connected extended meeting ends of said pipe line sections, connecting the meeting ends of said casing line sections in fluid tight relation, and repeating the foregoing steps for each succeeding casing line and pipe line section.

2. A method of installing and assembling a conduit system including casing and pipe line sections and spacers therebetween, the pipe line sections being of lengths greater than the casing line sections and extended through said casing line sections in slidable spaced relation thereto by said spacers and beyond the ends of said casing line sections which comprises: applying a spacer to each pipe line section intermediately its ends, individually engaging each pipe line section through a casing line section with the opposite ends of the former extended beyond the adjacent ends of the latter, positioning the casing and pipe line sections in endwise relation for a length of the conduit system while the corresponding ends of the casing line sections are relatively spaced and expose and afford access to the meeting ends of the respective pipe line sections, at one end of said length connecting the adjacent extended ends of the pipe line sections in fluid tight relation, then moving the succeeding casing line sections into end meeting engagement with the immediately preceding ones and connecting the same in fluid tight relation whereby the connected ends of the pipe line sections are vertically disaligned with the adjacent connected ends of the casing line sections and the pipe line progressively grows from one end of the casing line.

3. A method of installing and assembling an insulating conduit system including casing and pipe sections, spacers and insulating sleeves, the pipe sections being of lengths greater than the casing sections, which comprises securing a spacer about and to each pipe section intermediately of its ends; individually engaging said pipe sections through the casing sections in spaced relation thereto and the opposite ends of the pipe sections extended beyond the adjacent ends of their respective casing sections; engaging insulating sleeves snugly about and along the pipe sections in abutting engagement with the opposite sides of the spacer on each thereof; arranging the engaged pipe and casing sections in endwise relation for a length of the conduit system while the corresponding ends of the casing sections are relatively spaced and exposed and afford access to the meeting ends of the respective pipe sections, at one end of said length connecting the adjacent extended pipe section ends in fluid tight relation, moving the succeeding casing section longitudinally of the adjacent pipe section into meeting engagement with one end of the preceding casing section beyond and over the connected extended meeting ends of said pipe sections, connecting the meeting ends of said casing sections in fluid tight relation and repeating the foregoing steps for each succeeding casing section and pipe section.

4. A method of installing and assembling an insulated conduit system including casing and pipe sections, spacers and insulating sleeves, the pipe sections being of lengths greater than the casing sections, which comprises securing a spacer about and to each pipe section intermediately of its ends; individually engaging said pipe sections through the casing sections in spaced relation thereto and the opposite ends of the pipe sections extended beyond the adjacent ends of their respective casing sections; engaging insulating sleeves over and along the pipe sections in abutting engagement with the opposite sides of the spacer on each thereof, and extending said sleeves substantially to the ends of their respective casing sections with said opposite ends of the pipe sections extended beyond the same; arranging the engaged pipe and casing sections in endwise relation for a length of the conduit system while the corresponding ends of the casing sections are relatively spaced and expose and afford access to the meeting ends of the respective pipe sections, at one end of said length connecting the adjacent extended pipe section ends in fluid tight relation; engaging another insulating sleeve over and about the connected extended ends of the pipe sections in end abutting engagement with the adjacent insulating sleeves on the connected pipe sections, moving the succeeding casing section into end meeting engagement with the adjacent end of the preceding casing section and interconnecting the same in fluid tight relation, and repeating the foregoing steps for each succeeding casing section and pipe section.

5. A method of assembling a conduit system from a plurality of unit assemblies; each unit assembly comprising casing and pipe sections, the latter being longer than the former, and a spacer slidably mounting each pipe section in spaced relation to its casing section; said method comprising: applying a spacer to each pipe section intermediately its ends, individually engaging each pipe section through a casing section with the opposite ends of the former extended beyond the adjacent ends of the latter, positioning said unit assemblies in end to end relation for a length of the conduit system with the ends of adjacent pipe sections juxtaposed and the ends of adjacent casing sections spaced apart to expose and afford access to said juxtaposed ends of said pipe sections, at one end of said length joining the juxtaposed ends of said pipe sections in fluid tight relation, moving the next casing section toward the casing section at said one end until the adjacent ends thereof are in abutting relation, joining said abutting ends of said casing sections in fluid tight relation, and repeating the foregoing steps for each unit assembly.

6. A method of assembling a conduit system from a plurality of unit assemblies, each unit assembly comprising casing and pipe sections, the latter being longer than the former, a spacer slidably mounting each pipe section in spaced relation to its casing section, and a covering of insulation on said pipe section extending only to the ends of said casing section; said method comprising: assembling within each casing section a pipe section with a spacer intermediate its ends and a covering of insulation on each side thereof, positioning said unit assemblies in end to end relation for a length of the conduit system with the ends of adjacent pipe sections juxtaposed and the ends of adjacent casing sections spaced apart to expose and afford access to said juxtaposed ends of said pipe sections, at one end of said length joining the juxtaposed ends of said pipe sections in fluid tight relation, covering the joined ends of said pipe sections with insulation, moving the next casing section toward the casing section of said one end until the adjacent ends thereof are in abutting relation, joining said abutting ends of said casing sections in fluid tight relation, and repeating the foregoing steps for each unit assembly.

7. A method of assembling an insulated conduit system including casing and pipe sections, spacers and insulating sleeves, each pipe section being of greater length than the respective casing section and having a spacer positioned thereon intermediate its ends and having insulating sleeves extending thereabout and therealong from the spacer substantially to the end of the respective casing section, the method comprising: arranging the engaged pipe and casing sections in endwise relation for a length of the conduit system while the corresponding ends of the casing sections are relatively spaced and expose and afford access to the meeting ends of the respective pipe sections, at one end of said length connecting the adjacent extended pipe section ends in fluid tight relation, moving the succeeding casing section longitudinally of the adjacent pipe section into meeting engagement with one end of the preceding casing section beyond and over the connected extended meeting ends of said pipe sections, connecting the meeting ends of said casing sections in fluid tight relation and repeating the foregoing steps for each succeeding casing section and pipe section.

8. A method of installing and assembling an insulating conduit system including casing and pipe sections, spacers and insulating sleeves, the pipe sections being of lengths greater than the casing sections, which comprises applying a spacer about each pipe section intermediately of its ends; applying insulating sleeves snugly about and along each pipe section in abutting engagement with the opposite sides of the spacer thereon; individually engaging each pipe section through a casing section in spaced relation thereto with the opposite ends of the pipe section extended beyond the adjacent ends of its casing section; arranging the engaged pipe and casing sections in endwise relation for a length of the conduit system while the corresponding ends of the casing sections are relatively spaced and expose and afford access to the meeting ends of the respective pipe sections, at one end of said length connecting the adjacent extended pipe section ends in fluid tight relation, moving the succeeding casing section longitudinally of the adjacent pipe section beyond and over the connected extended meeting ends of said pipe sections, connecting the meeting ends of said casing sections in fluid tight relation and repeating the foregoing steps for each succeeding casing section and pipe section.

References Cited in the file of this patent

UNITED STATES PATENTS

| Number | Name | Date |
| --- | --- | --- |
| 2,014,355 | Hussman | Sept. 10, 1935 |
| 2,300,547 | Guarnaschelli | Nov. 3, 1942 |
| 2,329,000 | Rembert | Sept. 7, 1943 |
| 2,359,350 | Bruno | Oct. 3, 1944 |
| 2,483,839 | Oakley | Oct. 4, 1949 |